Patented Feb. 13, 1934

1,947,047

UNITED STATES PATENT OFFICE 1,947,047

VAT DYESTUFFS OF THE DIBENZANTHRONE SERIES AND PROCESS OF PREPARING THE SAME

Edward T. Howell, Milwaukee, Wis., assignor, by mesne assignments, to E. I. du Pont de Nemours & Company, a corporation of Delaware No Drawing. Application November 21, 1929
Serial No. 408,939

17 Claims. (Cl. 260—61)

This invention relates to vat dyestuffs which may be obtained from hydroxy derivatives of ketones of the perylene series and to a process of preparing the same.

It is already known that by treating dihydroxy dibenzanthrone as may be obtained according to U. S. Patent No. 1,093,427 with various alkylating agents very valuable dyestuffs may be obtained. Recent tendencies of technical opinion are to assume that these products are ether derivatives of the following dihydroxy-dibenzanthrone:

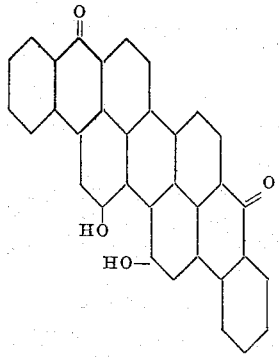

These dyestuffs vary in dyeing properties depending mainly upon the specific alkylating agent used. If methylating agents are used the product produced has been described as dyeing cotton in brilliant green shades. In the use of other alkylating agents, than those to produce the methoxy derivatives, the products obtained dye cotton in a much bluer hue. In general, the other ethers according to the literature dye cotton in blue to bluish green shades. From a study of the known products which have been prepared by the reaction of various alkylating agents upon dihydroxy dibenzanthrone, it was logical to conclude that, in general, those compounds prepared from alkylating agents of longer chain than a methyl group would result in final dyestuffs that would produce on the fibre shades decidedly more bluish than those produced by the methoxy derivative and that in many cases blue dyestuffs would result. All attempts heretofore made by varying the alkylating agent to obtain dyestuffs of this series capable of giving a more yellowish shade of green than is obtainable from the methoxy derivatives have, to the best of my knowledge, been unsuccessful. I believed, as have others familiar with the art, that it was a general rule that the longer the chain of the alkylating agent the more bluish the shade produced by the dyestuffs.

I have, however, now discovered that dyestuffs of this series capable of dyeing in shades equally as greenish as those obtained using the dimethoxy product, and some even yielding a more yellowish green tint, may be prepared by proper selection of the alkylating agent. These new alkylating agents have a relatively long chain, yet in many cases the dyestuffs obtained from them give dyeings substantially yellower in shade than the short chain methoxy type. More specifically, the alkylating agents which we have found to bring about these results contain the following general grouping:

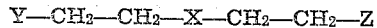

in which X is an oxygen (O) atom, an imine (NH) group or radical, or sulfur (S) atom, and wherein Y and Z both stand for the same or different strong acid radicals, for example, chloride, bromide, sulfate, or aryl-sulfonate, which are characterized by their capacity of reacting with aryl-OH-bodies to give ethers; or wherein one of the substituents Y and Z stands for a strong acid radical as above defined, while the other stands for an ether or ester radical, such as O-alkyl, O-acyl, or the like. In other words, my alkylating agents are characterized by the possession of such end groups that after complete reaction with dihydroxy-dibenzanthrone, a product will result containing the following grouping—

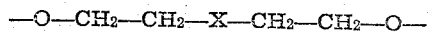

wherein X stands for O, S or an imine radical, and wherein one of the end oxygen atoms is linked to a dibenzanthrone radical, while the other is linked to an H atom, an alkyl group, an acyl group or the like, or to the same or to a different dibenzanthrone radical.

The above results are particularly surprising in view of the fact that the closely related alkylating agents toluene-sulfonic-acid-ester of glycol-mono-methyl, mono-ethyl or mono-n-butyl ethers give bluish green dyestuffs of distinctly more bluish shade than the products of this invention. See U. S. Patent 1,729,006 and German Patent 457,005.

The alkylating agents of my invention may be considered as beta, beta'-derivatives of diethyl-ether, diethyl-amine or diethyl sulfide, respectively. The alkylating agents are used in the form of their strong acid esters as for example the sulfonic acid ester or the halogen acid ester. These esters may be di-esters, as for instance, di-(p-toluene-sulfonic acid) ester of diethylene glycol, in which case, depending upon the ratio of reacting materials and temperature, there is obtained a product fast to acid or one relatively not fast to acid. Alternatively, these alkylating agents may be used in the form of mono-esters such as p-toluene-sulfonic acid ester of a mono-alkyl derivative of di-ethylene glycol; for instance, the sulfonic acid ester of mono-methyl-ether of diethylene glycol. In case a di-acid ester is used and the product obtained is of a type not fast to acid, this product can be further alkylated, since after saponification it appears to have a free hydroxyl group capable of alkylation.

The preferred dyestuffs of this invention have most probably a configuration in which the following group is present:

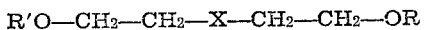

R'O—CH$_2$—CH$_2$—X—CH$_2$—CH$_2$—OR in which X is an oxygen atom, imine group, or sulfur atom and in which either or both R' and R are dibenzanthrone radicals or in which R' is a dibenzanthrone radical and R is a hydrogen atom, an alkyl, aryl, aralkyl, or acyl group.

It will be noted in this connection that the dyestuffs obtained in U. S. Patent 1,729,006 and German Patent 457,005 have the following grouping:

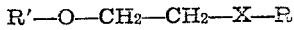

R'—O—CH$_2$—CH$_2$—X—R

R being an alkyl group. Thus the side chains of applicant's dyestuffs contain three inorganic atoms, while the dyestuffs of the patents mentioned have only two. It is surprising that this apparently minor difference in structure should give such enormous differences in shade of the final product.

These general groups may be introduced into a dihydroxy dibenzanthrone molecule by the known methods of introducing alkyl groups, which consist in general of digesting the dihydroxy dibenzanthrone in a solvent or diluent therefor with the specific ester. I have found that this alkylating reaction may be speeded up by the use of catalyzers.

I have further found that many of these products are not only dyestuffs themselves but they may also be used as intermediates for the production of other vat dyestuffs.

*Example 1*

An amount of aqueous paste equivalent to 60 parts of dihydroxy-dibenzanthrone (obtainable by the action of manganese dioxide on dibenzanthrone in sulfuric acid and then treating the product thus obtained with sodium bisulfite or other reducing agent) is heated with 900 parts of nitro-benzene and 5 parts of sodium carbonate (previously dissolved in 10 parts of water) at such a temperature that the water is driven off. 50 parts of sodium carbonate are now added, and the temperature raised to 200° C. 75 parts of di-(p-toluene-sulfonic acid) ester of diethylene glycol (obtained by the action of para-toluene-sulfone-chloride on diethylene glycol; white crystals of melting point 87 to 88° C.) are then added and the reaction mixture boiled under a reflux condenser until there is no unchanged dihydroxy dibenzanthrone present, which requires about 3 hours. In case the reaction has not ben completed (as indicated by a test sample dyeing) more sodium carbonate and more ester are added. The reaction mixture gradually takes on a green color. Upon completion of the reaction, the nitro-benzene is steam distilled off and the residue is filtered and washed with water. The product thus obtained comprises a dark green paste (or a dark greenish blue powder when dry) soluble in warm alkaline hydrosulfite with a blue color and reddish violet fluorescence from which cotton is dyed in blue shades turning to fast green upon exposure to the air. The dry product is soluble in concentrated sulfuric acid with reddish violet color and very slightly soluble in organic solvents with green color. It may be further purified by crystallization from a large amount of high boiling organic solvent such as nitrobenzene or by fractional crystallization from sulfuric acid.

*Example 2*

An amount of aqueous paste equivalent to 10 parts of dihydroxy-dibenzanthrone is heated with 1 part of sodium carbonate (dissolved in 3 parts of water) in 150 parts of nitro-benzene, with stirring, until all the water has been driven out. 7.5 parts of sodium carbonate are then added, and the mixture is heated at 205° C., when 20 parts of p-toluene-sulfo-ester of diethylene-glycol-monomethyl-ether (obtainable by the action of p-toluene-sulfone-chloride on diethylene-glycol-monomethyl-ether) are added, and the reaction mixture is then heated at the boiling point under a reflux condenser and stirred until there is no further change, which requires about 3 hours. The color of the reaction mixture gradually becomes greenish-blue. When the reaction is complete the nitro-benzene is driven off by distillation with steam, and the residue is filtered and washed with hot water. The product so obtained consists of a dark greenish paste, or when dry, of a dark blue powder soluble in concentrated sulfonic acid with reddish-violet color, and in alkaline hydro-sulfite to form a blue vat from which cotton is dyed in blue shades turning to a fast green on exposure to the air. The product is difficultly soluble with bluish-green color in ordinary organic solvents, but more soluble in high boiling organic solvents such as nitro-benzene.

*Example 3*

The p-toluene-sulfo-ester of diethylene-glycol-mono-ethyl-ether (obtainable by the action of p-toluene-sulfone-chloride on diethylene-glycol-mono-ethyl-ether) is used as in Example 2 in place of the sulfo ester of diethylene-glycol-mono-methyl-ether. When there is no further change, the reaction mixture is cooled, filtered and washed with several portions of nitro-benzene. The filtrate and washings are steam distilled free from nitro-benzene, leaving a product consisting of a vat dyestuff giving fast green shades on cotton, and having properties similar to those of the product obtained as in Example 2.

*Example 4*

An amount of aqueous paste equivalent to 10 parts of dihydroxy-dibenzanthrone and 2 parts of sodium carbonate (dissolved in 5 parts water) are heated with stirring in 150 parts of nitro-benzene until the water is driven out, when 15 parts of sodium carbonate are added, and the temperature of the mixture is raised to 200° C. The reaction mixture is then treated at the boiling point over a period of ½ hour with 20 parts of the p-toluene-sulfo-ester of diethylene-glycol-mono-butyl-ether (obtainable by the action of p-toluene-sulfone-chloride on diethylene-glycol-mono-butyl-ether) and heating is continued until there is no further change. If some unchanged intermediate is present after 2 to 3 hours' heating, the addition of further amounts of sodium carbonate and sulfo ester must be made. When the reaction is complete, the mass is cooled to room temperature, filtered and the filter cake washed with several portions of nitro-benzene, which is then driven out of the filtrate and washings by distillation with steam. The residue from the steam distillation is filtered and washed with hot water. The product thus obtained consists of a vat dyestuff which dyes cotton in green shades that are fast to light and which possess properties similar to those of the products of Examples 2 and 3.

*Example 5*

An amount of aqueous paste equivalent to 5 parts of dihydroxy-dibenzanthrone is heated with stirring in 100 parts nitro-benzene with 1 part of sodium carbonate (dissolved in 3 parts of water), until all the water has been driven out. 12 parts of sodium carbonate are then added, and the temperature raised to 200° C. There are then added 7.5 parts of the sulfo-ester which is obtainable by the action of p-toluene-sulfone-chloride on di-[β-hydroxy-ethyl] amine. The reaction mixture is then stirred an hour at boiling temperature, after which 5 parts more of the same sulfo ester are added, and heating is continued until the reaction is complete, which is usually the case after about 3 hours. When a test shows no unchanged intermediate, the reaction mixture is cooled to room temperature, filtered, and washed with toluene and alcohol. The filter cake may then be digested in warm water, filtered and washed free from salts with warm water. The product so obtained consists of a dark green paste or dark greenish-blue powder soluble in concentrated sulfuric acid with a cherry-red color, and in alkaline hydro-sulfite with a blue color and weak reddish-violet fluorescence, from which cotton is dyed in blue shades turning to a fast green on exposure to the air. The product contains nitrogen.

In the above examples, other high boiling inert organic solvents such as trichloro-benzene may be used. Furthermore, other sulfo-esters of the diethylene bodies may be used, such as the benzene sulfo-esters.

*Example 6*

An amount of aqueous paste equivalent to 5 parts of dihydroxy-dibenzanthrone is heated in 50 parts of nitro-benzene with 5 parts of sodium acetate crystals until all the water has been driven off. There are then added 1.5 parts of sodium carbonate and 10 parts of di-[β-bromo-ethyl] ether, boiling point 205–210° C. (obtainable by the action of hydrobromic acid on diethylene glycol) and the reaction mixture stirred about 7 hours at 170° C. The heating is continued with addition of 5 parts of di-[β-bromo-ethyl] ether and 2.5 parts of sodium carbonate until there is no further change. The color of the reaction mixture gradually changes to a bluish green. When there is no further change, the reaction mixture is diluted with 150 parts of alcohol, filtered and washed free from nitro-benzene with alcohol, and the filter cake may be freed from inorganic salts by digestion in warm water, filtering and washing. The product so obtained consists of a dark green paste soluble in concentrated sulfuric acid with a reddish-violet color, and in alkaline hydrosulfite with a blue color from which cotton is dyed in blue shades turning to green on exposure to the air.

*Example 7*

An amount of aqueous paste equivalent to 25 parts of dihydroxy-dibenzanthrone is heated with stirring in 375 parts of di-[β-chloro-ethyl] ether (B.P. 178° C.) until all of the water has been driven out. This operation is carried out in such a manner that the water and chlor-ether vapors pass up through a vertical insulated column bent downward at its upper end connecting with a condenser, the distillate from which enters a separator which separates the water from the dichlor-ether. The latter is returned to the reaction flask, while the water is run into a separate container, or discarded. When the water has been driven out (as indicated by a rise in temperature) there are then added 65 parts of sodium carbonate and 1.25 parts of cuprous chloride, and the reaction mixture is stirred at the boiling temperature under reflux for about 6 hours. At the end of this time, 1 part more of cuprous chloride is added, and the heating is continued until there is no unchanged intermediate, which usually requires about 6 more hours. When the reaction is complete the color becomes an intense bluish-green. The excess of dichlor-ether is then driven off by distillation with steam, and is recovered in good yield. The residue from the steam distillation is then filtered and washed with hot water. The product so obtained consists of a dark blue paste or powder soluble in concentrated sulfuric acid with a reddish-violet color and in alkaline hydrosulfite with a blue color and reddish-violet fluorescence, from which cotton is dyed blue turning to a bright fast green on exposure to the air. The product is sparingly soluble with greenish-blue to green colors in most organic solvents, but more soluble with bluish green color in high boiling solvents such as nitro-benzene.

*Example 8*

An amount of aqueous paste equivalent to 10 parts of dihydroxy dibenzanthrone is heated with stirring in 150 parts of nitro-benzene and 2 parts of sodium carbonate (dissolved in 4 parts water) at such a temperature that the water is driven off. 20 parts of sodium carbonate are then added, and the mixture is heated to 195° C. 15 parts of di-(p-toluene sulfonic acid) ester of diethylene glycol are then added and the reaction mixture is stirred about 1 and ½ hours at 195 to 200° C. so that the temperature never exceeds 200° C. 10 parts more of the above sulfo-ester are then added and heating continued at the same temperature for 2 hours, with addition of 5 parts of sodium carbonate and 5 parts more of the above sulfo-ester, and a further heating at the same temperature for about 3 more hours. During this time the reaction mixture assumes a bright green color. It is then cooled and the product isolated by filtration or by removing the nitro-benzene by steam distillation, filtering and washing with water. The product so obtained consists of a dark bluish-green paste dissolving in alkaline hydrosulfite with a blue color and reddish-violet fluorescence, and dyeing cotton blue shades which on exposure to the air turn to a bright yellowish-green.

The product obtained in this example is less fast to acid than the products obtained in Examples 1 to 7 inclusive. It may however, be readily converted into a product of good fastness by further alkylation with any alkylating agent, as set forth, for instance, in the following example.

Example 9

The reaction product obtained in Example 8 above and isolated by steam distilling off the nitro-benzene and filtering off the residue is added to 150 parts of nitro-benzene to which 2 parts of sodium carbonate dissolved in 4 parts of water has been added. This mixture is then heated with stirring until free of water. There are then added 20 parts of sodium carbonate and the temperature raised to 200° C. 10 parts of the methyl ester of p-toluene-sulfonic acid are then added and the reaction mixture heated at about 205° C. until a test dyeing of a portion is fast to acid. This usually requires ½ to 1 hour. The product is then isolated by cooling down and filtering. It consists of microscopic dark purple needles with metallic lustre, soluble in concentrated sulfuric acid with reddish violet color and in alkaline hydrosulfite with blue color from which cotton is dyed blue turning to fast green more yellowish than the product obtainable by the methylation of dihydroxy dibenzanthrone.

If instead of starting as above with the dihydroxy-dibenzanthrone, a dibenzanthrone body is used having an H-atom of one of the hydroxyl groups substituted by another group, as for example methyl, there are obtained dyestuffs which are mixed ethers, that is dyestuffs containing different ether groups. Such a starting material may be specifically exemplified by the following type: mono-hydroxy-mono-methoxy-dibenzanthrone.

The process of this invention may be applied in an analogous manner on nuclear substitution derivatives of dihydroxy dibenzanthrone for example, the halogenated dihydroxy-dibenzanthrones.

In the claims below it should be understood that where new products, dyestuffs, or articles of manufacture are claimed, I mean to include these bodies not only in substance, but also in whatever state they exist when applied to materials dyed, printed, or pigmented therewith.

I am aware that numerous details of the process may be varied through a wide range without departing from the principles of this invention, and I, therefore, do not purpose limiting the patent granted hereon otherwise than necessitated by the prior art.

I claim as my invention:

1. The process of producing vat dyestuffs, which comprises etherifying hydroxy derivatives of dibenzanthrones with an alkylating agent of the general formula $$Y-CH_2-CH_2-X-CH_2-CH_2-Z,$$

wherein X is an oxygen atom, an imine group or a sulfur atom, and wherein Y and Z both stand for the same or different strong acid radicals, or where one of the substituents Y or Z stands for a strong acid radical while the other stands for an ether or ester radical.

2. The process according to claim 1 in which the reaction is carried out in the presence of an alkali-metal carbonate.

3. The process of producing vat dyestuffs, which comprises etherifying hydroxy derivatives of dibenzanthrones with an alkylating agent of the general formula $$Y-CH_2-CH_2-O-CH_2-CH_2-Z,$$

wherein Y and Z both stand for the same or different strong acid radicals, or one of the substituents Y or Z stands for a strong acid radical while the other stands for an ether or ester radical.

4. The process of preparing vat dyestuffs which comprises reacting upon dihydroxy dibenzanthrone with an alkylating agent of the general formula $$Y-CH_2-CH_2-X-CH_2-CH_2-Z,$$

wherein X is an oxygen atom, an imine group or radical, or a sulfur atom, and wherein Y and Z both stand for the same or different strong acid radicals, or one of the substituents Y or Z stands for a strong acid radical while the other stands for an ether or ester radical, said reaction being carried out at lower temperatures than those leading to a product which has good fastness to acid and following this reaction by a methylation step to improve the fastness qualities of the product.

5. The process according to claim 4 in which the reaction is carried out in the presence of an alkali-metal carbonate.

6. The process of producing vat dyestuffs which comprises heating hydroxy-derivatives of dibenzanthrone with the di-(para-toluene-sulfonic acid)-ester of diethylene glycol to a temperature not exceeding 200° C. in the presence of a mildly alkaline substance, isolating a product which is not fast to acid and further heating this product with a methylating agent in the presence of a mildly alkaline substance.

7. The dyestuffs of the dibenzanthrone series including in their structure at least one dibenzanthrone radical and at least one radical of the type $O-CH_2-CH_2-X-CH_2-CH_2-O$, wherein X is an oxygen atom, a sulfur atom or an imine group, said dyestuffs being characterized by dyeing cotton from a reddish-violet vat in bluish-green to green to yellowish-green shades of good fastness to light.

8. The dyestuffs of the dibenzanthrone series including in their structure at least one dibenzanthrone radical and at least one radical of the type $$O-CH_2-CH_2-X-CH_2-CH_2-O$$

alkyl wherein X is an oxygen atom, a sulfur atom or an imine group, said dyestuffs being characterized by dyeing cotton from a reddish-violet vat in bluish-green to yellowish-green shades of good fastness to light.

9. The bluish-green to yellowish-green dyestuffs of the dibenzanthrone series, which are substantially identical with the dyestuffs obtainable by condensing dihydroxy-dibenzanthrone in nitrobenzene solution with the di-(p-toluene-sulfonic acid) ester of diethylene glycol under reflux conditions and in the presence of an alkali metal carbonate.

10. The process of producing vat dyestuffs, which comprises etherifying hydroxy derivatives of dibenzanthrone with an alkylating agent of the general formula $$Y-CH_2-CH_2-NH-CH_2-CH_2-Z,$$

wherein Y and Z both stand for the same or different strong acid radicals, or one of the substituents Y or Z stands for a strong acid radical while the other stands for an ether or ester radical.

11. The process of producing vat dyestuffs, which comprises etherifying hydroxy derivatives of dibenzanthrone with the di-(para-toluene sulfonic acid) ester of diethylene glycol.

12. The bluish-green to yellowish-green dyestuffs of the dibenzanthrone series, which are substantially identical with the dyestuffs obtainable by condensing dihydroxy-dibenzanthrone in nitrobenzene solution and in the presence of an alkali-metal carbonate with the sulfo-ester obtainable by the action of p-toluene-sulfone chloride on di-(beta-hydroxy-ethyl) amine.

13. The bluish-green to yellowish-green dyestuffs of the dibenzanthrone series, which are substantially identical with the dyestuffs obtainable by heating hydroxy derivatives of dibenzanthrone with the di-(para-toluene sulfonic acid) ester of diethylene glycol to a temperature not exceeding 200° C. in the presence of an alkali-metal carbonate, then adding a methylating agent and continuing the heating until a test sample of the dyestuff shows good fastness to light.

14. The process of preparing vat dyestuffs of the perylene series, which comprises reacting upon a dioxy dibenzanthrone body of the general formula

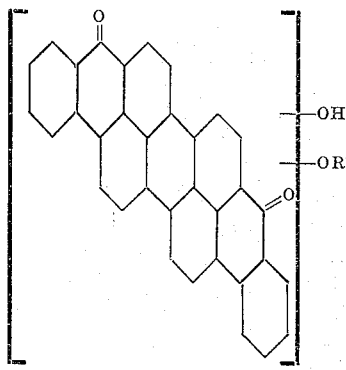

wherein R is a hydrogen atom or an alkyl group, and wherein the dibenzanthrone nucleus may be further substituted by halogen, with an alkylating agent of the general formula

Y—CH₂—CH₂—X—CH₂—CH₂—Z, wherein X is an oxygen atom, an amine group or radical or a sulfur atom, and wherein X and Y both stand for the same or different strong acid radicals, or one of the substituents Y or Z stands for a strong acid radical while the other stands for an ether or ester radical.

15. The process of preparing vat dyestuffs of the perylene series, which comprises reacting upon a dihydroxy dibenzanthrone body of the general formula

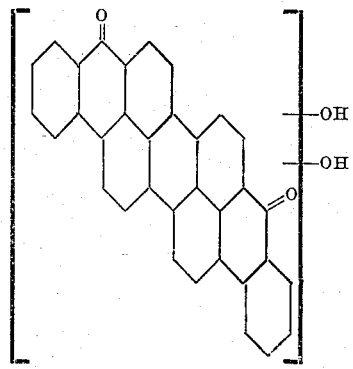

wherein the dibenzanthrone nucleus may be further substituted by halogen, with an alkylating agent of the general formula

Y—CH₂—CH₂—X—CH₂—CH₂—Z, wherein X is an oxygen atom, an amine group or radical or a sulfur atom, and wherein Y and Z both stand for the same or different strong acid radicals, or one of the substituents Y or Z stands for a strong acid radical while the other stands for an ether or ester radical.

16. The dyestuffs of the dibenzanthrone series including in their structure at least one dibenzanthrone radical and at least one radical of the type O—CH₂—CH₂—O—CH₂—CH₂—O, said dyestuffs being characterized by dyeing cotton from a reddish-violet bath in bluish-green to green to yellowish-green shades of good fastness to light.

17. The dyestuffs of the dibenzanthrone series including in their structure at least one dibenzanthrone radical and at least one radical of the type

O—CH₂—CH₂—NH—CH₂—CH₂—O, said dyestuffs being characterized by dyeing cotton from a reddish-violet vat in bluish-green to green to yellowish-green shades of good fastness to light.

EDWARD T. HOWELL.